United States Patent
Ma et al.

(10) Patent No.: US 12,412,129 B2
(45) Date of Patent: Sep. 9, 2025

(54) DISTRIBUTED SUPPORT VECTOR MACHINE PRIVACY-PRESERVING METHOD, SYSTEM, STORAGE MEDIUM AND APPLICATION

(71) Applicants: Xidian University, Xi'an (CN); Xi'an Xidian Blockchain Technology CO., Ltd., Xi'an (CN)

(72) Inventors: Lichuan Ma, Xi'an (CN); Qingqi Pei, Xi'an (CN); Zijun Huang, Xi'an (CN)

(73) Assignees: XIDIAN UNIVERSITY, Xi'An (CN); XI'AN XIDIAN BLOCKCHAIN TECHNOLOGY CO., LTD., Xi'An (CN)

( * ) Notice: Subject to any disclaimer, the term of this patent is extended or adjusted under 35 U.S.C. 154(b) by 1152 days.

(21) Appl. No.: 17/317,908

(22) Filed: May 12, 2021

(65) Prior Publication Data
US 2022/0237519 A1    Jul. 28, 2022

(30) Foreign Application Priority Data
Jan. 15, 2021 (CN) .......................... 202110054339.X

(51) Int. Cl.
G06N 20/10       (2019.01)
G06N 7/00        (2023.01)

(52) U.S. Cl.
CPC .............. *G06N 20/10* (2019.01); *G06N 7/00* (2013.01)

(58) Field of Classification Search
CPC ........... G06F 30/27; G06N 20/10; G06N 7/00
See application file for complete search history.

(56) References Cited

U.S. PATENT DOCUMENTS

2018/0218171 A1*  8/2018  Bellala ............... G06F 21/6254
2021/0209247 A1*  7/2021  Mohassel ............ A63B 21/023

OTHER PUBLICATIONS

Forero et.al, Consensus-based distributed linear support vector machines, Apr. 12, 2010, in Proceedings of the 9th ACM/IEEE International Conference on Information Processing in Sensor Networks (IPSN '10) (Year: 2010).*

(Continued)

*Primary Examiner* — Alexey Shmatov
*Assistant Examiner* — Duy T Diep
(74) *Attorney, Agent, or Firm* — Bayramoglu Law Offices LLC

(57) ABSTRACT

A distributed support vector machine privacy-preserving method includes: dividing a secret through secret sharing among all participating entities, iteratively exchanging a part of the information divided by the participating entities, and solving sub-problems locally; performing an iteration until a convergence is reached to find a global optimal solution; and in consideration of the generality of the privacy-preserving method, adopting a privacy-preserving method based on a vertical data distribution and a privacy-preserving method based on a horizontal data distribution, respectively; wherein the participating entities do not trust each other, and interact through a multi-party computation for local training. The method is applied to an honest-but-curious scenario, and uses the idea of data division to perform local computation through the interaction of part of the data among users to finally reconstruct the secret to preserve data privacy.

14 Claims, 4 Drawing Sheets

(56) References Cited

OTHER PUBLICATIONS

Jia et.al, Jia Q, Guo L, Fang Y, Wang G. Efficient Privacy-preserving Machine Learning in Hierarchical Distributed System, Jul. 24, 2018, IEEE Trans Netw Sci Eng (Year: 2018).*

Snyder et.al, Yao's Garbled Circuits: Recent Directions and Implementations, Apr. 14, 2014, University of Illinois at Chicago (Year: 2014).*

Demmler et.al, ABY—A Framework for Efficient Mixed-Protocol Secure Two-Party Computation, Feb. 7, 2015 (Year: 2015).*

Xu et.al, Privacy-Preserving Machine Learning Algorithms for Big Data Systems, Jul. 23, 2015, 2015 IEEE 35th International Conference on Distributed Computing Systems (Year: 2015).*

Keyless Technologies, A beginner's guide to Shamir's Secret Sharing, Mar. 7, 2020 (Year: 2020).*

* cited by examiner

DISTRIBUTED SUPPORT VECTOR MACHINE PRIVACY-PRESERVING METHOD, SYSTEM, STORAGE MEDIUM AND APPLICATION

CROSS REFERENCE TO THE RELATED APPLICATIONS

This application is based upon and claims priority to Chinese Patent Application No. 202110054339.X, filed on Jan. 15, 2021, the entire contents of which are incorporated herein by reference.

TECHNICAL FIELD

The present invention pertains to the technical field of data privacy-preserving, and more particularly, to a distributed support vector machine privacy-preserving method, system, storage medium and application.

BACKGROUND

Today's information age is now witnessing the explosive growth of data. As the scale of computer systems becomes larger and larger, distributed processing methods are increasingly accepted by the related industry. Moreover, machine learning algorithms have been applied to various fields. In this case, since the distributed processing method can handle a larger amount of samples, it can better exploit the advantages of machine learning algorithms so that the algorithms can be applied on a large scale. The support vector machine is one of the most widely used machine learning algorithms. Prior studies generally use alternating direction method of multipliers (ADMM) algorithms to solve machine learning optimization problems such as optimization problems of support vector machines. Meanwhile, data used for training are owned by multiple entities, but the sharing and training of the data are hindered due to the sensitivity of the data. Most distributed algorithms require each node to explicitly exchange and disclose state information to its neighboring node in each iteration. This means that many practical distributed applications face serious privacy issues. In this regard, it is unacceptable to merely save the original data locally for privacy-preserving, and it is also necessary to preserve the privacy of the interactive parameters in the process of implementing the distributed ADMM algorithm. Herein, an ADMM algorithm-based privacy-preserving technique will be presented based on a support vector machine scenario.

However, existing research on privacy-preserving of support vector machine scenarios still faces challenges to be urgently solved in terms of privacy and accuracy. Two methods are commonly used to realize privacy-preserving in distributed optimization algorithms. The first method is a perturbation method, which mainly uses the technique of differential privacy. This method is highly efficient, but introduces noise and thus will cause the loss of data availability and impair the accuracy of the optimization results. Although the related studies have made a balance between privacy and accuracy, the speed of convergence to the optimal classifier will always slow down. The second method is a cryptographic method, including secure multi-party technology and homomorphic encryption. The homomorphic encryption method has excessively high computational overhead and is thus difficult to apply to practical applications. Additionally, in the current research, most of the support vector machine privacy-preserving scenarios involve only distributed deployment of data and single-machine processing without considering the privacy leakage problem of information interaction during the collaborative training of the fully distributed support vector machine algorithm with multiple machines and multiple data sources. Some research work has focused on the privacy leakage problem, but has not fully resolved the horizontal and vertical distribution of data.

As analyzed above, the prior art has the following problems and shortcomings. The existing distributed support vector machines have mutually reciprocal shortcomings between computational overhead and security. That is, a high-security method has the problem of high computational overhead, whereas a high-efficiency method has security issues. In addition, such methods must give consideration to both the machine learning scenario and the accuracy of the training results.

The difficulty of solving the above-mentioned problems and shortcomings is: to solve the privacy problem of the interactive computation of the intermediate states in the machine learning training process. Although homomorphic encryption can perform multi-party secure computation, it incurs high computational complexity.

To solve the above-mentioned problems and shortcomings, it is highly desirable to provide a high-efficiency method capable of simultaneously ensuring the security of multi-party computation when processing data for machine learning training to achieve the same effectiveness as homomorphic encryption without substantial overhead, thereby preserving data privacy based on the premise of an ensured accuracy of the training results.

SUMMARY

In view of the problems in the prior art, the present invention provides a distributed support vector machine privacy-preserving method, system, storage medium and application.

The present invention is achieved by adopting the following technical solutions. A distributed support vector machine privacy-preserving method includes: dividing a secret through a secret sharing among all participating entities, iteratively exchanging a part of information divided by the participating entities, and solving sub-problems locally; performing an iteration until a convergence is reached to find a global optimal solution; and in consideration of the generality of the privacy-preserving method, adopting a privacy-preserving method based on a vertical data distribution and a privacy-preserving method based on a horizontal data distribution, respectively; wherein the participating entities do not trust each other, and interact through a multi-party computation for local training.

Further, the distributed support vector machine privacy-preserving method specifically includes:

step 1: establishing a network communication environment with a plurality of data sources;

step 2: choosing a support vector machine scenario with a vertical distribution or a horizontal distribution according to a data distribution of the data sources;

step 3: allowing all participating entities to solve the sub-problems locally;

step 4: allowing all participating entities to use a Boolean sharing to split a penalty parameter and exchange a part of the penalty parameter with a neighboring node to update the parameter;

step 5: allowing all participating entities to use an arithmetic sharing to split an updated iterative variable and exchange a part of the updated iterative variable with the neighboring node to compute a Lagrange parameter in a shared form;

step 6, allowing all participating entities to reconstruct the secret;

step 7, returning to step 3 if the iteration does not reach the convergence; and step 8, outputting a training result.

Further, an objective function of the horizontal distribution and an objective function of the vertical distribution in step 2 are respectively:

$$\min_{v_i, \xi_i} \frac{1}{2} \sum_{i=1}^{N} v_i^T (I_{D+1} - \Pi_{D+1}) v_i + NC \sum_{i=1}^{N} 1_i^T \xi_i$$

$$s.t. \begin{cases} Y_i B_i V_i \geq 1_i - \xi_i, \xi_i \geq 0, (i = 1, \ldots, N) \\ AV = 0 \end{cases};$$

and wherein $v_i = [\omega_i^T, b_i]^T$, $V = [v_1^T, \ldots v_N^T]^T$, $B_i = [X_i, 1_i^T]$, $1_i \in R^{1*M}$, $X_i$ is an $i^{th}$ participant and a $j^{th}$ participant, $X_i = [[x_{i1}^T, \ldots x_{iM}^T]^T]$, $Y_i = \text{diag}(y_{i1}, \ldots, y_{iM})$, $y_{ij}$ is a $j^{th}$ data entry and a corresponding label, $\xi_i = [\xi_{i1}, \ldots, \xi_{iM}]$, N is a number of participants, and M is a number of training set samples for each participant of the participants; and $$\min \sum_{i=1}^{N} \frac{1}{2} v_i^T (I_{D+1} - \Pi_{D+1}) v_i + 1_M^T \left( 1_M - Y \sum_{i=1}^{N} B_i v_i \right)_+$$

$$s.t. \ z_i = B_i v_i, i = 1, \ldots;$$

wherein $v_i = [\omega_i^T, b_i]^T$, $B_i = [X_i, 1_M]$, $1_M \in R^{M*1}$, $Y_i = \text{diag}(y_1, \ldots, Y_M)$, $y_j$ is the $j^{th}$ data entry and the corresponding label.

Further, iterative processes of solving the sub-problems locally in step 3 are respectively:

horizontal data distribution:

$$\{v_i^{k+1}, \xi_i^{k+1}\} = \text{argmin}_{v_i, \xi_i} L(v_i \xi_i \rho^k \lambda^k) + \frac{r_i}{2} \| v_i - v_i^k \|^2,$$

$$\rho^k \to \rho^{k+1},$$

$$\lambda_{i,i+1}^{k+1} = \lambda_{i,i+1}^k + \rho_{i,i+1}^{k+1} (v_i^{k+1} - v_{i+1}^{k+1});$$

and vertical data distribution $$v_i^{k+1} = \text{argmin}_{v_i} f_i(vi) + \frac{\rho}{2} \| B_i v_i - B_i v_i^k - z^k + \overline{Bv}^k + u^k \|^2,$$

$$z^{k+1} = \text{argmin}_z g(Nz) + \frac{N\rho}{2} \| z - \overline{Bv}^{k+1} - u^k \|^2,$$

$$u^{k+1} = u^k + \overline{Bv}^{k+1} - z^{k+1}.$$

Further, a method of using the Boolean sharing to split the penalty parameter in step 4 specifically includes: considering $\rho^k \to \rho^{k+1}$ is a progressive increase and an upper bound is $r_i$, obtaining an appropriate value through a comparison to update $\rho$, and dividing $\rho_{i,i+1}^k$ into $\rho_{i,i+1}^k = q_{i,i+1}^k + q_{i+1,i}^k$ to securely compute $\rho_{i,i+1}^k$; wherein an $i^{th}$ participant provides $q_{i,i+1}^k$ and $q_{i,i+1}^{k+1}$, and an $(i+1)^{th}$ participant provides $q_{i+1,i}^k$ and $q_{i+1,i}^{k+1}$; comparing $q_{i,i+1}^k + q_{i+1,i}^k$ with $q_{i,i+1}^{k+1} + q_{i+1,i}^{k+1}$ without exposing $q_{i,i+1}^k$, $q_{i+1,i}^k$, and $q_{i+1,i}^{k+1}$, converting each term into a Boolean type, and performing a secure addition and comparison by using a Yao's garbled circuit.

Further, a method of using the arithmetic sharing to split the penalty parameter in step 5 specifically includes: in a $(k+1)^{th}$ iteration, securely computing $$\rho_{i,i+1}^{k+1} (v_{i+1}^{k+1} - v_i^{k+1}) \text{ as } (q_{i,i+1}^{k+1} + q_{i+1,i}^{k+1})(v_{i+1}^{k+1} - v_i^{k+1})$$

by using Shamir's secret sharing, and arithmetically dividing each term, wherein an $i^{th}$ participant provides $\langle q_{i,i+1}^{k+1} \rangle_1^A$, $\langle q_{i,i+1}^{k+1} \rangle_2^A$, $\langle -v_i^{k+1} \rangle_1^A$, $\langle -v_i^{k+1} \rangle_2^A$, $\langle -q_{i,i+1}^{k+1} v_i^{k+1} \rangle_1^A$, and $\langle -q_{i,i+1}^{k+1} v_i^{k+1} \rangle_2^A$, an $(i+1)^{th}$ participant provides $\langle q_{i+1,i}^{k+1} \rangle_1^A$, $\langle q_{i+1,i}^{k+1} \rangle_2^A$, $\langle v_{i+1}^{k+1} \rangle_1^A$, $\langle v_{i+1}^{k+1} \rangle_2^A$, $\langle q_{i+1,i}^{k+1} v_{i+1}^{k+1} \rangle_1^A$, and $\langle q_{i+1,i}^{k+1} v_{i+1}^{k+1} \rangle_2^A$, the $i^{th}$ participant sends $\langle q_{i,i+1}^{k+1} \rangle_2^A$, $\langle -v_i^{k+1} \rangle_2^A$ and $\langle -q_{i,i+1}^{k+1} v_i^{k+1} \rangle_2^A$ to the $(i+1)^{th}$ participant, the $(i+1)^{th}$ participant sends $\langle q_{i+1,i}^{k+1} \rangle_1^A$, $\langle v_{i+1}^{k+1} \rangle_1^A$ and $\langle q_{i+1,i}^{k+1} v_{i+1}^{k+1} \rangle_1^A$ to the $i^{th}$ participant, and the $i^{th}$ participant locally computes $\langle -q_{i+1,i}^{k+1} v_i^{k+1} \rangle_1^A$ and $\langle q_{i+1,i}^{k+1} v_{i+1}^{k+1} \rangle_1^A$ to finally determine the value of $(q_{i,i+1}^{k+1} + q_{i+1,i}^{k+1})(v_{i+1}^{k+1} + v_i^{k+1})$ in the shared form as $\langle (q_{i,i+1}^{k+1} + q_{i+1,i}^{k+1})(v_{i+1}^{k+1} - v_i^{k+1}) \rangle_1^A = \langle q_{i,i+1}^{k+1} v_{i+1}^{k+1} \rangle_1^A + \langle q_{i+1,i}^{k+1} v_{i+1}^{k+1} \rangle_1^A + \langle -q_{i+1,i}^{k+1} v_i^{k+1} \rangle_1^A + \langle -q_{i,i+1}^{k+1} v_i^{k+1} \rangle_1^A$; and similarly, the $(i+1)^{th}$ participant computes $\langle (q_{i,i+1}^{k+1} + q_{i+1,i}^{k+1})(v_{i+1}^{k+1} - v_i^{k+1}) \rangle_2^A = \langle q_{i,i+1}^{k+1} v_{i+1}^{k+1} \rangle_2^A + \langle q_{i+1,i}^{k+1} v_{i+1}^{k+1} \rangle_2^A + \langle -q_{i+1,i}^{k+1} v_i^{k+1} \rangle_2^A + \langle -q_{i,i+1}^{k+1} v_i^{k+1} \rangle_2^A$.

Further, a method of reconstructing the secret in step 6 specifically includes: allowing both parties to reconstruct the secret $(q_{i,i+1}^k + q_{i+1,i}^k)(v_{i+1}^k - v_i^k)$ as $(q_{i,i+1}^k + q_{i+1,i}^k)(v_{i+1}^k - v_i^k) = \langle ((q_{i,i+1}^k + q_{i+1,i}^k)(v_{i+1}^k - v_i^k) \rangle_1^A + \langle (q_{i,i+1}^k + q_{i+1,i}^k)(v_{i+1}^k - v_i^k) \rangle_2^A$, and compute $\lambda_{i,i+1}^{k+1} = \lambda_{i,i+1}^k + \rho_{i,i+1}^{k+2} (v_i^{k+1} - v_{i+1}^{k+1})$ to update $\lambda$.

Another objective of the present invention is to provide a computer-readable storage medium, wherein a computer program is stored in the computer-readable storage medium. When the computer program is executed by a processor, the processor executes the following steps: dividing a secret through a secret sharing among all participating entities, iteratively exchanging a part of information divided by the participating entities, and solving sub-problems locally; performing an iteration until a convergence is reached to find a global optimal solution; in consideration of the generality of a privacy-preserving method, adopting a privacy-preserving method based on a vertical data distribution and a privacy-preserving method based on a horizontal data distribution, respectively. The participating entities do not trust each other, and interact through a multi-party computation for local training.

Another objective of the present invention is to provide a distributed support vector machine privacy-preserving system for implementing the distributed support vector machine privacy-preserving method. The distributed support vector machine privacy-preserving system includes:

an information preprocessing module, configured for dividing a secret through secret sharing among all participating entities, iteratively exchanging a part of information divided by the participating entities, and solving sub-problems locally;

an information iterative processing module, configured for performing an iteration until a convergence is reached to find a global optimal solution; and a privacy-preserving module, configured for adopting a privacy-preserving method based on a vertical data distribution and a privacy-preserving method based on a horizontal data distribution, respectively. The participating entities do not trust each other, and interact through a multi-party computation for local training.

Another objective of the present invention is to provide a distributed support vector machine for implementing the distributed support vector machine privacy-preserving method.

By means of the above technical solutions, the present invention has the following advantages. According to the present invention, the support vector machine for privacy-preserving is trained by combining an ADMM algorithm and the secret sharing. During a training process among the entities, the entities exchange part of the information divided by themselves for collaborative training. The present invention is based on an honest-but-curious model, in which all participating entities do not trust each other, and complete the training under the premise that individual information will not be leaked. Compared with the data processing method based on homomorphic encryption, the present invention has the features of simple computation and low computational overhead. Compared with the differential privacy method, the present invention provides cryptographically strong and secure privacy-preserving without affecting the accuracy of the training result.

TABLE 1

Comparison between efficiencies of a multi-party secure computation scheme and a homomorphic encryption scheme

| | | FSCM-C | | | |
| --- | --- | --- | --- | --- | --- |
| D | Q | Offline | Online | ADMIVI-Paillier | FSVM-S |
| 100 | 100 | 0.214 | 2.76E-4 | 0.0698 | 2.19E-4 |
| 200 | 200 | 0.810 | 3.10E-4 | 0.155 | 2.75E-4 |
| 300 | 300 | 1.83 | 3.33E-4 | 0.217 | 2.92E-4 |
| 400 | 400 | 3.24 | 3.70E-4 | 0.297 | 3.07E-4 |
| 500 | 500 | 5.13 | 4.01E-4 | 0.362 | 3.20E-4 |
| 600 | 600 | 7.46 | 4.16E-4 | 0.432 | 3.32E-4 |
| 700 | 700 | 10.02 | 4.53E-4 | 0.509 | 3.44E-4 |
| 800 | 800 | 13.21 | 4.82E-4 | 0.615 | 3.67E-4 |
| 900 | 900 | 16.60 | 5.08E-4 | 0.647 | 3.79E-4 |
| 1000 | 1000 | 20.56 | 5.35E-4 | 0.722 | 3.98E-4 |

In the present invention, the distributed support vector machine privacy-preserving method is based on a secure multi-party computation and an ADMM algorithm and, in an honest-but-curious scenario, uses the idea of data division to perform local computation through the interaction of part of the data among users, thereby finally reconstructing the secret to preserve data privacy. Since the whole data value of a single user is related to privacy information, after the data is divided, each collaborative user is allocated a part of the data for local computation. In this way, the partners entirely cannot get the relevant privacy information of other users, and all information with explicit semantics which the partner may obtain is only its own value and the final computed result.

BRIEF DESCRIPTION OF THE DRAWINGS

In order to explain the technical solutions of the embodiments of the present invention more clearly, the drawings used in the embodiments of the present invention will be briefly introduced below. Obviously, the drawings described below are only some embodiments of the present invention. Those of ordinary skill in the art can obtain other drawings based on these drawings without creative efforts.

DETAILED DESCRIPTION OF THE EMBODIMENTS

In order to make the objectives, technical solutions, and advantages of the present invention clearer, the present invention will be further described in detail below with reference to the embodiments. It should be understood that the specific embodiments described herein are only used to explain the present invention, rather than to limit the present invention.

In view of the problems in the prior art, the present invention provides a distributed support vector machine privacy-preserving method, system, storage medium and application. The present invention will be described in detail below with reference to the drawings. Herein, local support vector machine sub-problems are solved by using a gradient descent method. Since the gradient descent method has a slow convergence rate and may converge to a local optimal solution, it may be replaced with improved methods such as damped Newton's method and variable metric method to solve the local sub-problems. In consideration of the real scenario, different entities can use different methods to solve the local sub-problems.

Figure 1:
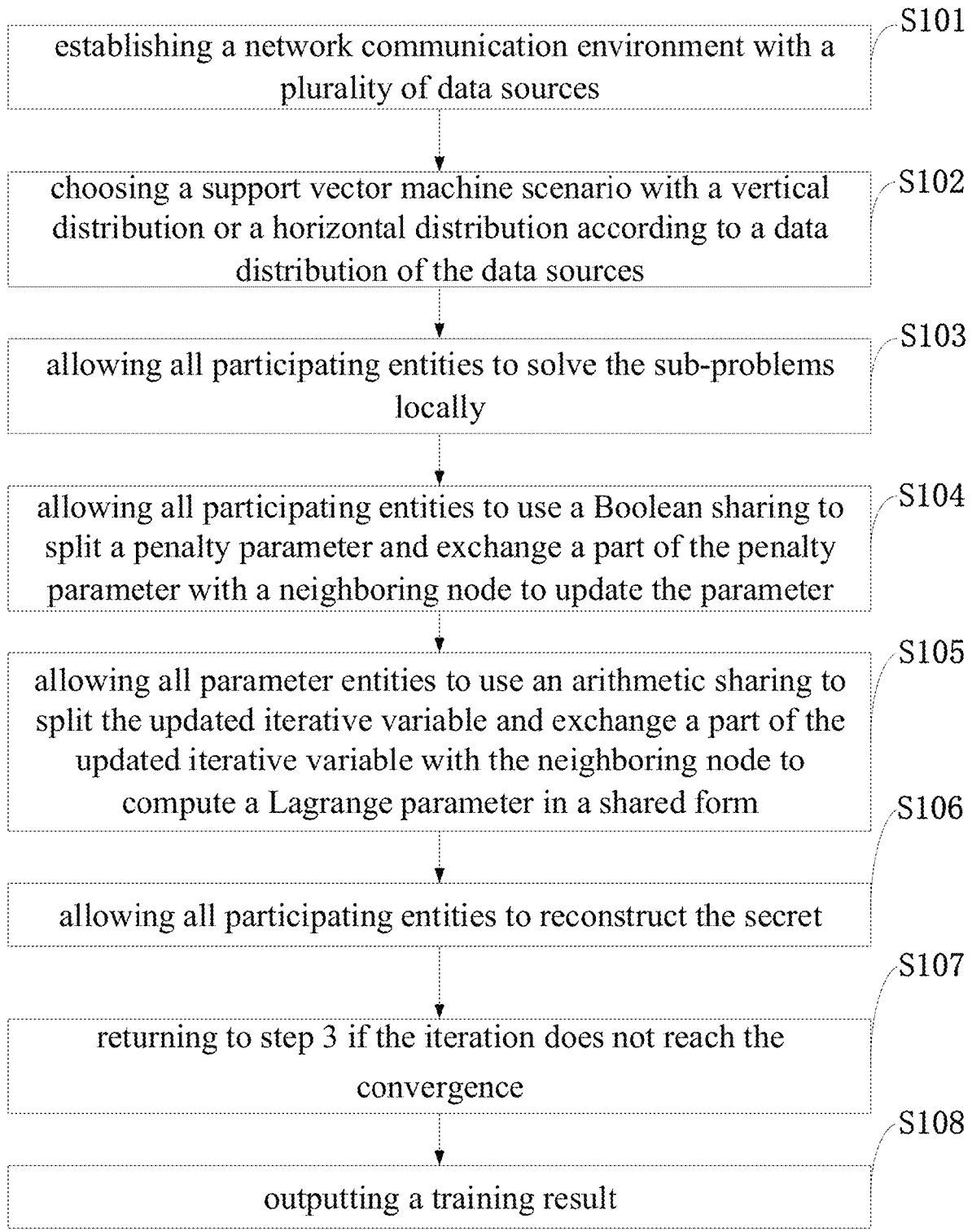
FIG. 1 is a flow chart of a distributed support vector machine privacy-preserving method according to an embodiment of the present invention.

As shown in FIG. 1, according to the present invention, a distributed support vector machine privacy-preserving method includes the following steps:

S101: a network communication environment with a plurality of data sources is established;

S102: a support vector machine scenario with a vertical distribution or a horizontal distribution is chosen according to a data distribution of the data sources;

S103: all participating entities solve the sub-problems locally by using a gradient descent method;

S104: all participating entities use Boolean sharing to split a penalty parameter and exchange a part of the penalty parameter with a neighboring node to update the parameter;

S105: all participating entities use arithmetic sharing to split the updated iterative variable and exchange a part of the updated iterative variable with the neighboring node to compute a Lagrange parameter in a shared form;

S106, all participating entities reconstruct the secret;

S107, returning to S103 if the iteration does not converge; and

S108, a training result is output.

Those of ordinary skill in the art can also implement the distributed support vector machine privacy-preserving method by using other steps. FIG. 1 only illustrates a specific embodiment of the distributed support vector machine privacy-preserving method of the present invention.

Figure 2:
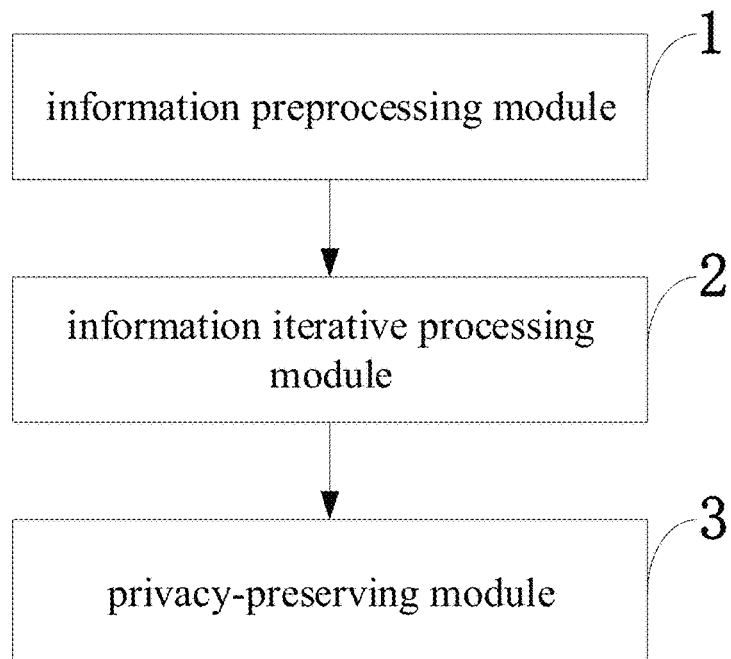
FIG. 2 is a structural schematic diagram of a distributed support vector machine privacy-preserving system according to an embodiment of the present invention, wherein 1 represents information preprocessing module; 2 represents information iterative processing module; and 3 represents privacy-preserving module.

As shown in FIG. 2, according to the present invention, a distributed support vector machine privacy-preserving system includes:

the information preprocessing module 1, configured for dividing a secret through secret sharing among all participating entities, iteratively exchanging a part of the information divided by the participating entities, and solving subproblems locally;

the information iterative processing module 2, configured for performing an iteration until a convergence is reached to find a global optimal solution; and the privacy-preserving module 3, configured for adopting a privacy-preserving method based on a vertical data distribution and a privacy-preserving method based on a horizontal data distribution, respectively; wherein the participating entities do not trust each other, and interact through a multi-party computation for local training.

The technical solutions of the present invention will be further described below with reference to the drawings.

According to the present invention, the distributed support vector machine privacy-preserving method includes: dividing a secret through secret sharing among all participating entities, iteratively exchanging a part of the information divided by the participating entities, and solving subproblems locally; performing an iteration until a convergence is reached to find a global optimal solution; and in consideration of the generality of the privacy-preserving method, adopting a privacy-preserving method based on a vertical data distribution and a privacy-preserving method based on a horizontal data distribution, respectively; wherein the participating entities do not trust each other, and interact through a multi-party computation for local training.

Figure 3:
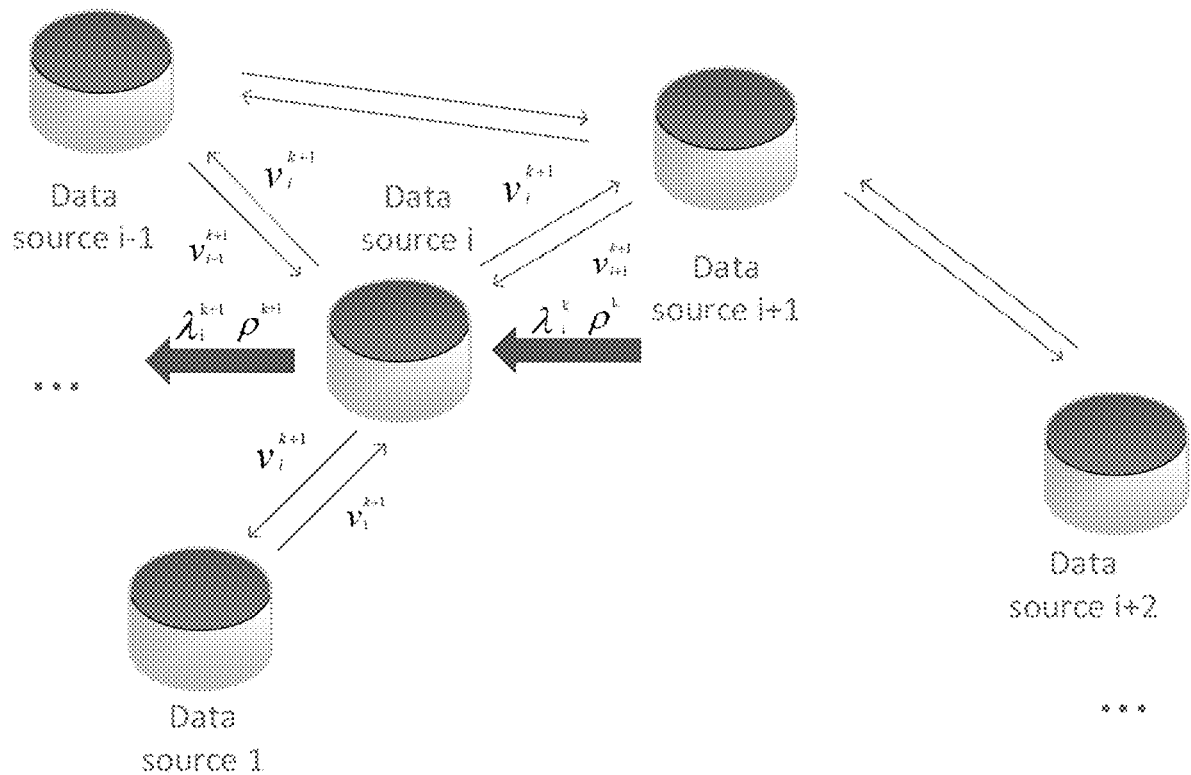
FIG. 3 is a schematic diagram of an application scenario according to an embodiment of the present invention.

As shown in FIG. 3, the application scenario of the present invention is a training process of a fully distributed multi-data source support vector machine, and the network includes users participating in the training. According to the network topology, the users who need to participate in the training set an initial value. In the iterative process, the value that needs to be computed collaboratively is divided through secret sharing and then exchanged for computation. Since the divided data cannot get any intermediate-state privacy information, data privacy and security are preserved.

Figure 4:
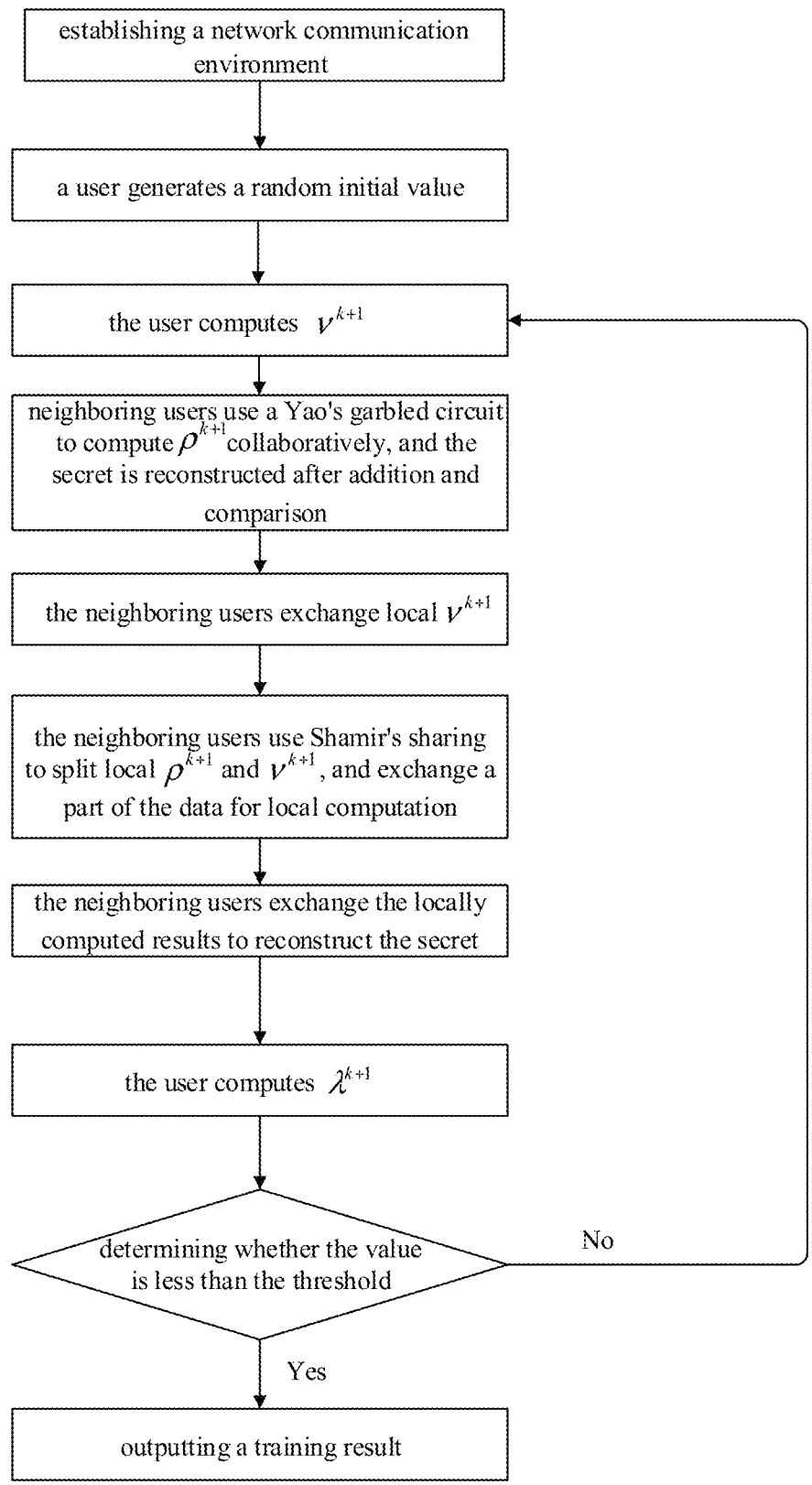
FIG. 4 is a schematic diagram of the implementation principle of the distributed support vector machine privacy-preserving method based on secure multi-party computation according to an embodiment of the present invention.

As shown in FIG. 4, according to an embodiment of the present invention, the distributed support vector machine privacy-preserving method based on secure multi-party computation specifically includes the following steps:

Step 1: a network communication environment is established, and a network topology situation where multiple users are adjacent to each other is considered when the number of different users is set.

Step 2: the iterative processes of solving the objective function for training the support vector machine are determined according to the data distribution of the data sources.

Step 3: in the $(k+1)^{th}$ iteration, the user first updates $v_i^{k+1}$ according to the penalty function $\rho$ and the Lagrange coefficient $\lambda$ updated in the $k^{th}$ iteration.

Step 4: in the $(k+1)^{th}$ iteration, the user updates the penalty coefficient $\rho$ by taking the progressive increase as a constraint condition. $\rho_{i,\,i+1}^{k}$ is divided into $\rho_{i,\,i+1}^{k}=q_{i,\,i+1}^{k}+q_{i+1,\,i}^{k}$ to securely compute $\rho_{i,\,i+1}^{k}$. The $i^{th}$ participant provides $q_{i,\,i+1}^{k}$ and $q_{i,\,i+1}^{k+1}$, and the $(i+1)^{th}$ participant provides $q_{i+1,\,i}^{k}$ and $q_{i+1,\,i}^{k+1}$. $q_{i,\,i+1}^{k}+q_{i+1,\,i}^{k}$ is compared with $q_{i,\,i+1}^{k+1}+q_{i+1,\,i}^{k+1}$ without exposing $q_{i,\,i+1}^{k}, q_{i+1,\,i}^{k}, q_{i,\,i+1}^{k+1}$, and $q_{i+1,\,i}^{k+1}$. Each term is converted into a Boolean type, and is securely added and compared by using a Yao's garbled circuit. One party encrypts the truth table, one party performs circuit computation, and finally the secret is reconstructed. In this way, an appropriate penalty coefficient $\rho$ is determined.

Step 5: in the $(k+1)^{th}$ iteration, the user solves the Lagrange coefficient $\lambda_{i,\,i+1}^{k+1}$ by using the updated $v_i^{k+1}$ and $\rho_{i,\,i+1}^{k}$, and securely computes $\rho_{i,\,i+1}^{k}(v_{i+1}^{k+1}-v_i^{k+1})$ as $(q_{i,\,i+1}^{k+1}+q_{i+1,\,i}^{k+1})(v_{i+1}^{k+1}-v_i^{k+1})$ by using Shamir's secret sharing. Each term is arithmetically divided. The $i^{th}$ participant provides $\langle q_{i,\,i+1}^{k+1}\rangle_1^A$, $\langle q_{i,\,i+1}^{k+1}\rangle_2^A$, $\langle -v_i^{k+1}\rangle_1^A$, $\langle -v_i^{k+1}\rangle_2^A$, $\langle -q_{i,\,i+1}^{k+1}v_i^{k+1}\rangle_1^A$, and $\langle -q_{i,\,i+1}^{k+1}v_i^{k+1}\rangle_2^A$, and the $(i+1)^{th}$ participant provides $\langle q_{i+1,\,i}^{k+1}\rangle_1^A$, $\langle q_{i+1,\,i}^{k+1}\rangle_2^A$, $\langle v_{i+1}^{k+1}\rangle_1^A$, $\langle v_{i+1}^{k+1}\rangle_2^A$, $\langle q_{i+1,\,i}^{k+1}v_{i+1}^{k+1}\rangle_1^A$, and $\langle q_{i+1,\,i}^{k+1}v_{i+1}^{k+1}\rangle_2^A$. The $i^{th}$ participant sends $\langle q_{i,\,i+1}^{k+1}\rangle_2^A$, $\langle -v_i^{k+1}\rangle_2^A$ and $\langle -q_{i,\,i+1}^{k+1}v_i^{k+1}\rangle_2^A$ to the $(i+1)^{th}$ participant. The $(i+1)^{th}$ participant sends $\langle q_{i+1,\,i}^{k+1}\rangle_1^A$, $\langle v_{i+1}^{k+1}\rangle_1^A$ and $\langle q_{i+1,\,i}^{k+1}v_{i+1}^{k+1}\rangle_1^A$ to the $i^{th}$ participant. The $i^{th}$ participant locally computes $\langle -q_{i+1,\,i}^{k+1}v_i^{k+1}\rangle_1^A$ and $\langle q_{i,\,i+1}^{k+1}v_{i+1}^{k+1}\rangle_1^A$ to finally determine the value of $(q_{i,\,i+1}^{k+1}+q_{i+1,\,i}^{k+1})(v_{i+1}^{k+1}-v_i^{k+1})$ in the shared form as $\langle(q_{i,\,i+1}^{k+1}+q_{i+1,\,i}^{k+1})(v_{i+1}^{k+1})\rangle_1^A = \langle q_{i,\,i+1}^{k+1}v_{i+1}^{k+1}\rangle_1^A + \langle q_{i+1,\,i}^{k+1}v_{i+1}^{k+1}\rangle_1^A + \langle -q_{i+1,\,i}^{k+1}v_i^{k+1}\rangle_1^A + \langle -q_{i,\,i+1}^{k+1}v_i^{k+1}\rangle_1^A$. Similarly, the $(i+1)^{th}$ participant computes $\langle(q_{i,\,i+1}^{k+1}+q_{i+1,\,i}^{k+1})(v_{i+1}^{k+1}-v_i^{k+1})\rangle_2^A = \langle q_{i,\,i+1}^{k+1}v_{i+1}^{k+1}\rangle_2^A + \langle q_{i+1,\,i}^{k+1}v_{i+1}^{k+1}\rangle_2^A + \langle -q_{i+1,\,i}^{k+1}v_i^{k+1}\rangle_2^A + \langle -q_{i,\,i+1}^{k+1}v_i^{k+1}\rangle_2^A$.

Step 6: the interacting participating parties reconstruct the secret $(q_{i,\,i+1}^{k}+q_{i+1,\,i}^{k})(v_{i+1}^{k}-v_i^{k})$ as $(q_{i,\,i+1}^{k}+q_{i+1,\,i}^{k})(v_{i+1}^{k}-v_i^{k})=\langle(q_{i,\,i+1}^{k}+q_{i+1,\,i}^{k})(v_{i+1}^{k}-v_i^{k})\rangle_1^A + \langle(q_{i,\,i+1}^{k}+q_{i+1,\,i}^{k})(v_{i+1}^{k}-v_i^{k})\rangle_2^A$, and compute $\lambda_{i,\,i+1}^{k+1}=\lambda_{i,\,i+1}^{k}+\rho_{i,\,i+1}^{k+1}(v_{i+1}^{k+1}-v_{i+1}^{k+1})$ to update $\lambda_{i,\,i+1}^{k+1}$.

Step 7: according to a set threshold E, when a value of the objective function at a current iteration minus a value of the objective function at a previous iteration is less than the threshold, it is determined that the convergence is reached. Otherwise, returning to step 3 to continue the iteration.

Step 8: a training result is output.

The effectiveness of the present invention will be further described below in conjunction with experiments.

1. Experimental Conditions

The experiment is simulated under Ubuntu-18.04.1, and the function of secure multi-party computation is implemented by using an ABY framework. The privacy-preserving scheme is implemented by c++.

2. Experimental Results and Analysis

In the present invention, Ubuntu is selected for simulation. The MNIST data set and the breast cancer data set are selected for a test. 2, 3, 4, 5, and 6 nodes are selected to perform a horizontal distribution experiment and a vertical distribution experiment, respectively. In the simulation experiment, the classification accuracy of the support vector machine is 98%.

In the experiment, the established network communication model faces the threat of data privacy leakage. Different users collaborate to train the support vector machine, and the intermediate state of the interaction during the training process will leak privacy information such as gradient and objective function. The development of distributed scenarios brings an increasing amount of data. In order to break data silos and carry out certain collaborative training scenarios, a feasible privacy-preserving method is indispensable. The prior distributed support vector machines have mutually reciprocal shortcomings between computational overhead and security. That is, a high-security method has the problem of high computational overhead, whereas a high-efficiency method has security issues. In addition, such methods must give consideration to both the machine learning scenario and the accuracy of the training results. In the present invention, the support vector machine for privacy-preserving is trained by combining the ADMM algorithm and the secret sharing. During the training process among the entities, the entities exchange part of the information divided by themselves for collaborative training. The present invention is based on an honest-but-curious model, in which all participating entities do not trust each other, and complete the training under the premise that individual information will not be leaked.

Figure 5:
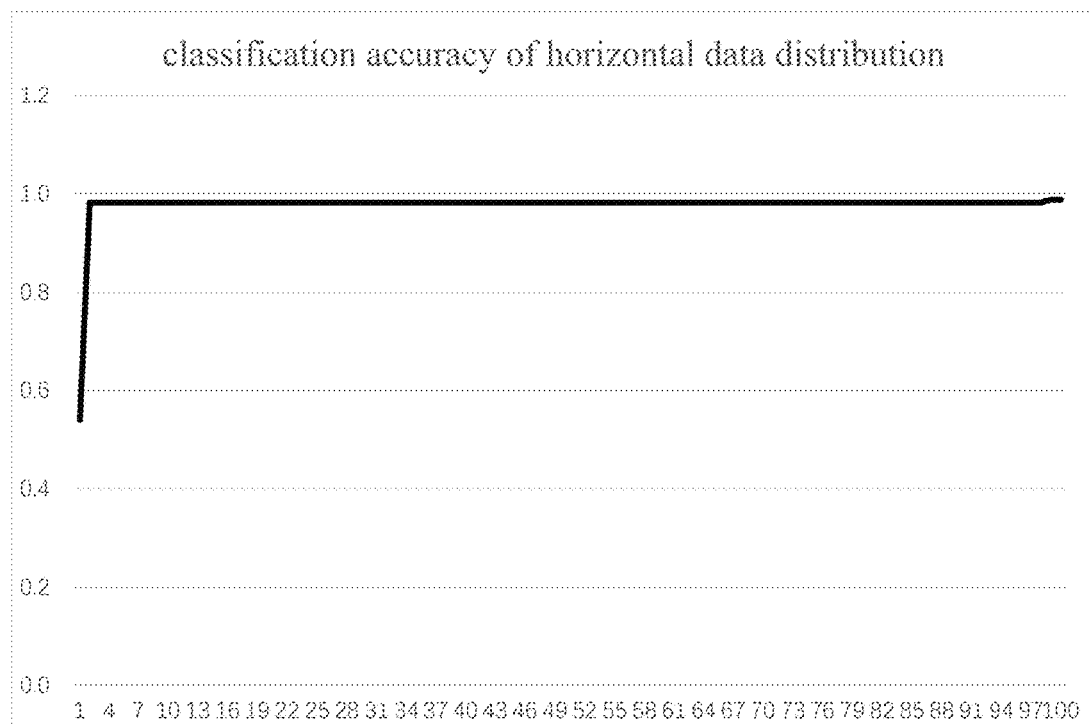
FIG. 5 is a first schematic diagram of the collaborative training of two nodes of a breast cancer data set according to an embodiment of the present invention.

FIG. 5 illustrates the collaborative training of two nodes of a breast cancer data set, in which the classification accuracy of the support vector machine based on the privacy-preserving ADMM algorithm in the horizontal data distribution scenario is 98.2%, while the classification accuracy in the case where only one node uses the gradient descent method to solve the optimization problem is also 98%. Therefore, it can be known that the method of the present invention provides cryptographically strong and secure privacy-preserving without affecting the accuracy of the training results.

Figure 6:
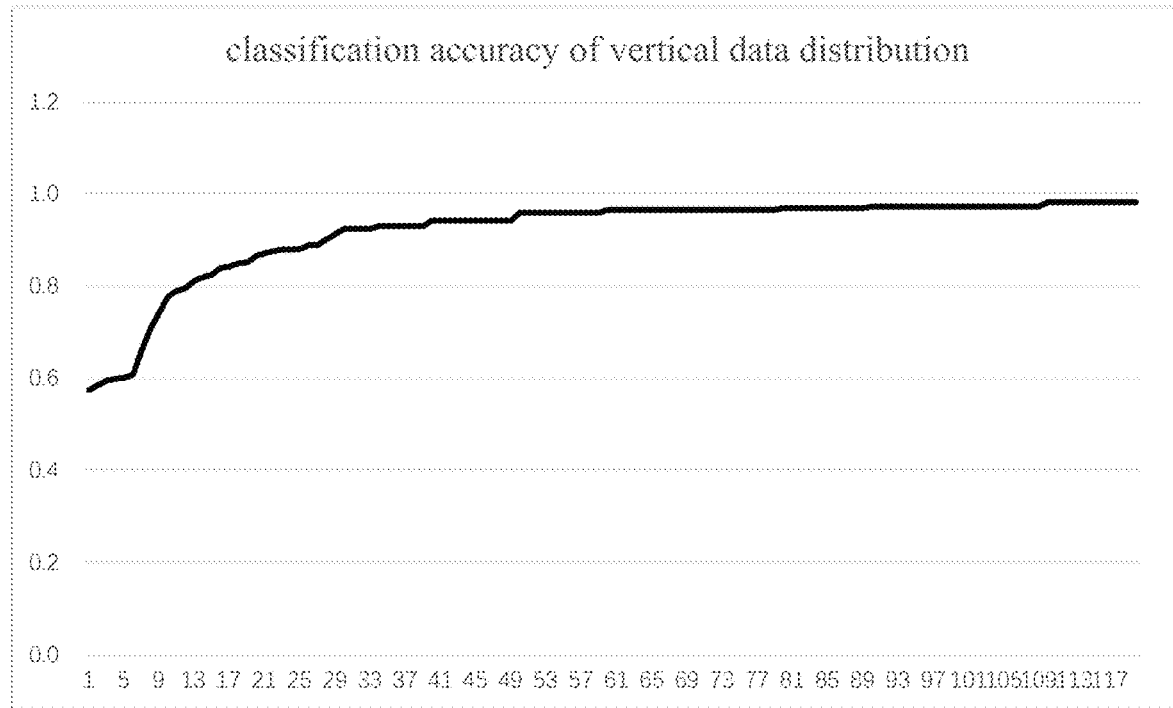
FIG. 6 is a second schematic diagram of the collaborative training of the two nodes of the breast cancer data set according to an embodiment of the present invention.

FIG. 6 illustrates the collaborative training of the two nodes of the breast cancer data set. The classification accuracy of the support vector machine based on the privacy-preserving ADMM algorithm in the vertical data distribution scenario is 97.7%. When the vertical distribution is applied to an actual scenario, different entities can have data sets with different features, and collaborate to train a global classification model.

It should be noted that the embodiments of the present invention can be implemented by hardware, software, or a combination of software and hardware. The hardware part can be implemented by dedicated logic. The software part can be stored in a memory, and the system can be executed by appropriate instructions, for example, the system can be executed by a microprocessor or dedicated hardware. Those of ordinary skill in the art can understand that the above-mentioned devices and methods can be implemented by using computer-executable instructions and/or control codes included in a processor. Such codes are provided, for example, on a carrier medium such as a magnetic disk, compact disc (CD) or digital video disk read-only memory (DVD-ROM), a programmable memory such as a read-only memory (firmware), or a data carrier such as an optical or electronic signal carrier. The device and its modules of the present invention can be implemented by very large-scale integrated circuits or gate arrays, semiconductors such as logic chips and transistors, or programmable hardware devices such as field programmable gate arrays and programmable logic devices, and other hardware circuits. Optionally, the device and its modules of the present invention can be implemented by software executed by various types of processors, or can be implemented by a combination of the hardware circuit and the software as mentioned above, such as firmware.

The above only describes the specific embodiments of the present invention, but the scope of protection of the present invention is not limited thereto. Any modifications, equivalent replacements, improvements and others made by any person skilled in the art within the technical scope disclosed in the present invention and the spirit and principle of the present invention shall fall within the scope of protection of the present invention.

What is claimed is:

1. A distributed support vector machine privacy-preserving method, wherein the method is performed by a distributed support vector machine, and the method comprising:
   dividing a secret through a secret sharing among a plurality of participating machines, iteratively exchanging a part of information divided by the plurality of participating machines, and solving sub-problems locally at each of the plurality of participating machines;
   performing an iteration until a convergence is reached to find a global optimal solution; and
   in consideration of generality of the distributed support vector machine privacy-preserving method, adopting the distributed support vector machine privacy-preserving method based on a vertical data distribution and the distributed support vector machine privacy-preserving method based on a horizontal data distribution, respectively, wherein the plurality of participating machines interact through a multi-party computation for local training at each of the plurality of participating machines;
   step 1: establishing, by a processor, a network communication environment with a plurality of data sources;
   step 2: choosing, by the processor, a support vector machine scenario with a vertical distribution or a horizontal distribution according to a data distribution of the plurality of data sources;
   step 3: solving, by the plurality of participating machines, the sub-problems locally at each of the plurality of participating machines;
   step 4: splitting, by the plurality of participating machines, a penalty parameter using a Boolean sharing and exchanging, by the plurality of participating machines, a part of the penalty parameter with a neighboring node to update the penalty parameter;
   step 5: splitting, by the plurality of participating machines, an updated iterative variable using an arithmetic sharing and exchanging, by the plurality of participating machines, a part of the updated iterative variable with the neighboring node to compute a Lagrange parameter in a shared form;
   step 6, reconstructing, by the plurality of participating machines, the secret;
   step 7, returning to step 3 if the iteration does not reach the convergence; and
   step 8, outputting, by the processor, a training result;
   wherein
   an objective function of the horizontal distribution and an objective function of the vertical distribution in step 2 are respectively:

$$\min_{v_i, \xi_i} \frac{1}{2} \sum_{i=1}^{N} v_i^T (I_{D+1} - \Pi_{D+1}) v_i + NC \sum_{i=1}^{N} 1_i^T \xi_i$$

$$\text{s.t.} \begin{cases} Y_i B_i V_i \geq 1_i - \xi_i, \xi_i \geq 0_i (i=1, \ldots, N); \\ AV = 0 \end{cases}$$

wherein i refers to the $i^{th}$ participant; $M_i$ is the number of training data entries in the $i^{th}$ participant's local training dataset; N is the number of participants; D refers to a number of attributes of each data entry in the dataset; C refers to the penalty parameter; T refers to transpose operation in math; ω stands for a normal vector of the hyperplane and b is an interception of the hyperplane with a y-axis; for a more concise description of the above equation, we introduce a column vector $v_i$ of the form $v_i = [(\omega_i^T, b_i)]^T$, to stands for the transpose of the vector $\omega_i^T$ plus one element $b_i$; the term V, where $V = [(v_1^T, \ldots v_N^T)]^T$, is a column vector that stores all the elements of the vectors $v_i$ (i=1, ..., N) and this term is also used to make the above equation concise; R refers to the set of real numbers and $R^{1*M_i}$ is the set of all the row vectors of dimension $M_i$ whose elements are real numbers; $X_i$ is the matrix of dimension $M_i \times D$, that stores all the training data vectors of the $i^{th}$ participant and its form is $X_i = [x_{i1}^T, \ldots x_{iM_i}^T]$; the term $B_i$, of the form $B_i = [X_i, 1_i^T]$, is the matrix that contains $X_i$ plus one column vector whose elements are all 1; $y_{ij}$ is the corresponding label of the $j^{th}$ data entry in the $i^{th}$ participant's local training dataset; $Y_i = \text{diag}(y_{i1}, \ldots, y_{iM_i})$ is a matrix of dimension $M_i \times M_i$, whose diagonal elements are $y_{ij}$ (j=1, ..., $M_i$) and other elements are all 0; $\xi_i = [\xi_{i1}, \ldots, \xi_{iM_i}]$ is the vector that stores the slack variables for each data entry of the $i^{th}$ participant: and $$\min \sum_{i=1}^{N} \frac{1}{2} v_i^T (I_{D_i+1} - \Pi_{D_i+1}) V_i + 1_M^T \left(1_M - Y \sum_{i=1}^{N} B_i v_i\right)_+$$

$$\text{s.t.} \quad z_i = B_i v_i, i=1, \ldots, N;$$

wherein $v_i = [\omega_i^T, b_i]^T$, $B_i = [X_i, 1_M]$, $1_M \in R^{M*1}$, $Y_i = \text{diag}(y_1, \ldots, y_M)$, $y_j$ is the $j^{th}$ data entry and the corresponding label.

2. The distributed support vector machine privacy-preserving method according to claim 1, wherein iterative processes of solving the sub-problems locally in step 3 are respectively:

for the horizontal data distribution:

$$\{v_i^{k+1}, \xi_i^{k+1}\} = \text{argmin}_{v_i, \xi_i} L(v_i \xi_i \rho^k \lambda^k) + \frac{r_i}{2} \|v_i - v_i^k\|^2,$$

$$\rho^k \to \rho^{k+1},$$

$$\lambda_{i,i+1}^{k+1} = \lambda_{i,i+1}^k + \rho_{i,i+1}^{k+1} (v_i^{k+1} - v_{i+1}^{k+1});$$

and
for the vertical data distribution:

$$v_i^{k+1} = \text{argmin}_{v_i} f_i(v_i) + \frac{\rho}{2} \|B_i v_i - B_i v_i^k - z^k + \overline{Bv}^k + u^k\|^2,$$

$$z^{k+1} = \text{argmin}_z g(Nz) + \frac{N\rho}{2} \|z - \overline{Bv}^{k+1} - u^k\|^2,$$

$$u^{k+1} = u^k + \overline{Bv}^{k+1} - z^{k+1}.$$

wherein k refers to $k^{th}$ iteration, z is a variable to formulate an ADMM objective function of a sharing form, $f$ is a general denotation of the function to form the objective function that would be optimized by the ADMM algorithm, q refers to the arithmetic share of ρ, ξ refers to a slack variable, and u is the scaled dual variable.

3. The distributed support vector machine privacy-preserving method according to claim 2, wherein a method of using the Boolean sharing to split the penalty parameter in step 4 specifically comprises:
considering $\rho^k \to \rho^{k+1}$ is a progressive increase and an upper bound is $r_i$, obtaining a value of the penalty parameter ρ through a comparison to update the penalty parameter ρ, and dividing $\rho_{i, i+1}^k$ into $\rho_{i, i+1}^k = q_{i, i+1}^k + q_{i+1, i}^k$ to securely compute $\rho_{i, i+1}^k$; wherein an $i^{th}$ participant provides $q_{i, i+1}^k$ and $q_{i, i+1}^{k+1}$, and an $(i+1)^{th}$ participant provides $q_{i+1, i}^k$ and $q_{i+1, i}^{k+1}$;
comparing $q_{i, i+1}^k + q_{i+1, i}^k$ with $q_{i, i+1}^{k+1} + q_{i+1, i}^{k+1}$ without exposing $q_{i, i+1}^k$, $q_{i+1, i}^k$, $q_{i, i+1}^{k+1}$, and $q_{i+1, i}^{k+1}$, converting each term into a Boolean type, and performing a secure addition and the comparison by using a Yao's garbled circuit.

4. The distributed support vector machine privacy-preserving method according to claim 3, wherein a method of using the arithmetic sharing to split the penalty parameter in step 5 specifically comprises:
in a $(k+1)^{th}$ iteration, securely computing $\rho_{i, i+1}^{k+1} (v_{i+1}^{k+1} - v_i^{k+1})$ as $(q_{i, i+1}^{k+1} + q_{i+1, i}^{k+1})(v_{i+1}^{k+1} - v_i^{k+1})$ by using Shamir's secret sharing, and arithmetically dividing each term, wherein an $i^{th}$ participant provides $\langle q_{i, i+1}^{k+1} \rangle_1^A$, $\langle q_{i, i+1}^{k+1} \rangle_2^A$, $\langle -v_i^{k+1} \rangle_1^A$, $\langle -v_i^{k+1} \rangle_2^A$, $\langle -q_{i, i+1}^{k+1} v_i^{k+1} \rangle_1^A$, and $\langle -q_{i, i+1}^{k+1} v_i^{k+1} \rangle_2^A$, an $(i+1)^{th}$ participant provides $\langle q_{i+1, i}^{k+1} \rangle_1^A$, $\langle q_{i+1, i}^{k+1} \rangle_2^A$, $\langle v_{i+1}^{k+1} \rangle_1^A$, $\langle v_{i+1}^{k+1} \rangle_2^A$, $\langle q_{i+1, i}^{k+1} v_{i+1}^{k+1} \rangle_1^A$, and $\langle q_{i+1, i}^{k+1} v_{i+1}^{k+1} \rangle_2^A$, the $i^{th}$ participant sends $\langle q_{i, i+1}^{k+1} \rangle_2^A$, $\langle -v_i^{k+1} \rangle_2^A$ and $\langle -q_{i, i+1}^{k+1} v_i^{k+1} \rangle_2^A$ to the $(i+1)^{th}$ participant, the $(i+1)^{th}$ participant sends $\langle q_{i+1, i}^{k+1} \rangle_1^A$, $\langle v_{i+1}^{k+1} \rangle_1^A$ and $\langle q_{i+1, i}^{k+1} v_{i+1}^{k+1} \rangle_1^A$ to the $i^{th}$ participant, and the $i^{th}$ participant locally computes $\langle -q_{i+1, i}^{k+1} v_i^{k+1} \rangle_1^A$ and $\langle q_{i, i+1}^{k+1} v_{i+1}^{k+1} \rangle_1^A$ to finally determine a value of $(q_{i, i+1}^{k+1} + q_{i+1, i}^{k+1})(v_{i+1}^{k+1} - v_i^{k+1})$ in the shared form as $\langle (q_{i, i+1}^{k+1} + q_{i+1, i}^{k+1})(v_{i+1}^{k+1} - v_i^{k+1}) \rangle_1^A = \langle q_{i, i+1}^{k+1} v_{i+1}^{k+1} \rangle_1^A + \langle q_{i+1, i}^{k+1} v_{i+1}^{k+1} \rangle_1^A + \langle -q_{i+1, i}^{k+1} v_i^{k+1} \rangle_1^A + \langle -q_{i, i+1}^{k+1} v_i^{k+1} \rangle_1^A$; and the $(i+1)^{th}$ participant computes $\langle (q_{i, i+1}^{k+1} + q_{i+1, i}^{k+1})(v_{i+1}^{k+1} - v_i^{k+1}) \rangle_2^A = \langle q_{i, i+1}^{k+1} v_{i+1}^{k+1} \rangle_2^A + \langle q_{i+1, i}^{k+1} v_{i+1}^{k+1} \rangle_2^A + \langle -q_{i+1, i}^{k+1} v_i^{k+1} \rangle_2^A + \langle -q_{i, i+1}^{k+1} v_i^{k+1} \rangle_2^A$.

5. The distributed support vector machine privacy-preserving method according to claim 4, wherein
a method of reconstructing the secret in step 6 specifically comprises:
allowing the plurality of participating machines to reconstruct the secret $(q_{i,\,i+1}{}^k+q_{i+1,\,i}{}^k)(v_{i+1}{}^k-v_i{}^k)$ as $(q_{i,\,i+1}{}^k+q_{i+1,\,i}{}^k)(v_{i+1}{}^k-v_i{}^k) = \langle (q_{i,\,i+1}{}^k+q_{i+1,\,i}{}^k)(v_{i+1}{}^k-v_i{}^k)\rangle_1{}^A + \langle (q_{i,\,i+1}{}^k+q_{i+1,\,i}{}^k)(v_{i+1}{}^k-v_i{}^k)\rangle_2{}^A$, and compute $\lambda_{i,\,i+1}{}^{k+1}=\lambda_{i,\,i+1}{}^k+\rho_{i,\,i+1}{}^{k+1}(v_i^{k+1}-v_{i+1}^{k+1})$ to update the Lagrange parameter $\lambda$.

6. A computer-readable storage medium, wherein a computer program is stored in the computer-readable storage medium, and when the computer program is executed by a processor, the processor executes the following steps:
dividing a secret through a secret sharing among a plurality of participating machines, iteratively exchanging a part of information divided by the plurality of participating machines, and solving sub-problems locally at each of the plurality of participating machines;
performing an iteration until a convergence is reached to find a global optimal solution;
in consideration of generality of a distributed support vector machine privacy-preserving method, adopting the distributed support vector machine privacy-preserving method based on a vertical data distribution and the distributed support vector machine privacy-preserving method based on a horizontal data distribution, respectively; wherein the plurality of participating machines interact through a multi-party computation for local training at each of the plurality of participating machines;
step 1: establishing, by a processor, a network communication environment with a plurality of data sources;
step 2: choosing, by the processor, a support vector machine scenario with a vertical distribution or a horizontal distribution according to a data distribution of the plurality of data sources;
step 3: solving, by the plurality of participating machines, the sub-problems locally at each of the plurality of participating machines;
step 4: splitting, by the plurality of participating machines, a penalty parameter using a Boolean sharing and exchanging, by the plurality of participating machines, a part of the penalty parameter with a neighboring node to update the penalty parameter;
step 5: splitting, by the plurality of participating machines, an updated iterative variable using an arithmetic sharing and exchanging, by the plurality of participating machines, a part of the updated iterative variable with the neighboring node to compute a Lagrange parameter in a shared form;
step 6, reconstructing, by the plurality of participating machines, the secret;
step 7, returning to step 3 if the iteration does not reach the convergence; and
step 8, outputting, by the processor, a training result;
wherein
an objective function of the horizontal distribution and an objective function of the vertical distribution in step 2 are respectively:

$$\min_{v_i,\xi_i} \frac{1}{2}\sum_{i=1}^{N} v_i^T(I_{D+1}-\Pi_{D+1})v_i + NC\sum_{i=1}^{N} 1_i^T\xi_i$$

-continued
$$\text{s.t.} \begin{cases} Y_iB_iV_i \succcurlyeq 1_i - \xi_i, \xi_i \succcurlyeq 0_i (i=1,\ldots,N); \\ AV = 0 \end{cases}$$

wherein i refers to the $i^{th}$ participant; $M^i$ is the number of training data entries in the $i^{th}$ participant's local training dataset; N is the number of participants; D refers to a number of attributes of each data entry in the dataset; C refers to the penalty parameter; T refers to transpose operation in math; $\omega$ stands for a normal vector of the hyperplane and b is an interception of the hyperplane with a y-axis; for a more concise description of the above equation, we introduce a column vector $v_i$ of the form $v_i=[(\omega_i^T,b_i]^T$, to stands for the transpose of the vector $\omega_i^T$ plus one element $b_i$; the term V, where $V=[(v_i^T,\ldots v_N^T]^T$, is a column vector that stores all the elements of the vectors $v_i(i=1,\ldots,N)$ and this term is also used to make the above equation concise; R refers to the set of real numbers and $R^{1*M_i}$ is the set of all the row vectors of dimension $M_i$ whose elements are real numbers; $X_i$ is the matrix of dimension $M_i \times D$, that stores all the training data vectors of the $i^{th}$ participant and its form is $X_i=[x_{i1}^T,\ldots x_{iM}^T]$; the term $B_i$, of the form $B_i=[X_i, 1_i^T]$, is the matrix that contains $X_i$ plus one column vector whose elements are all 1; $y_{ij}$ is the corresponding label of the $j^{th}$ data entry in the $i^{th}$ participant's local training dataset; $Y_i=\text{diag}(y_{i1},\ldots,y_{iM_i})$ is a matrix of dimension $M_i \times M_i$, whose diagonal elements are $y_{ij}(j=1,\ldots,M_i)$ and other elements are all 0; $\xi_i=[\xi_{i1},\ldots,\xi_{iM_i}]$ is the vector that stores the slack variables for each data entry of the $i^{th}$ participant: and $$\min\sum_{i=1}^{N} \frac{1}{2}v_i^T(I_{D_i+1}-\Pi_{D_i+1})V_i + 1_M^T\left(1_M - Y\sum_{i=1}^{N} B_iv_i\right)_+$$

s.t. $z_i = B_iv_i, i=1,\ldots,N;$ wherein $v_i=[\omega_i^T,b_i]^T$, $B_i=[X_i, 1_M]$, $1_M \in R^{M*1}$, $Y_i=\text{diag}(y_1,\ldots,y_M)$, $y_j$ is the $j^{th}$ data entry and the corresponding label.

7. A distributed support vector machine privacy-preserving system for implementing the distributed support vector machine privacy-preserving method according to claim 1, comprising:
an information preprocessing module, configured for dividing the secret through the secret sharing among the plurality of participating machines, iteratively exchanging the part of the information divided by the plurality of participating machines, and solving the sub-problems locally;
an information iterative processing module, configured for performing the iteration until the convergence is reached to find the global optimal solution; and
a privacy-preserving module, configured for adopting the distributed support vector machine privacy-preserving method based on the vertical data distribution and the distributed support vector machine privacy-preserving method based on the horizontal data distribution, respectively.

8. A distributed support vector machine for implementing the distributed support vector machine privacy-preserving method according to claim 1.

9. The distributed support vector machine privacy-preserving system according to claim 7, wherein
iterative processes of solving the sub-problems locally in step 3 are respectively:
for the horizontal data distribution:

$$\{v_i^{k+1}, \xi_i^{k+1}\} = \operatorname{argmin}_{v_i, \xi_i} L(v_i \xi_i \rho^k \lambda^k) + \frac{r_i}{2} \|v_i - v_i^k\|^2,$$

$$\rho^k \to \rho^{k+1},$$

$$\lambda_{i,i+1}^{k+1} = \lambda_{i,i+1}^k + \rho_{i,i+1}^{k+1}(v_i^{k+1} - v_{i+1}^{k+1});$$

and
for the vertical data distribution:

$$v_i^{k+1} = \operatorname{argmin}_{v_i} f_i(v_i) + \frac{\rho}{2}\|B_i v_i - B_i v_i^k - z^k + \overline{Bv}^k + u^k\|^2,$$

$$z^{k+1} = \operatorname{argmin}_z g(Nz) + \frac{N\rho}{2}\|z - \overline{Bv}^{k+1} - u^k\|^2,$$

$$u^{k+1} = u^k + \overline{Bv}^{k+1} - z^{k+1}.$$

wherein k refers to $k^{th}$ iteration, z is a variable to formulate an ADMM objective function of a sharing form, $f$ is a general denotation of the function to form the objective function that would be optimized by the ADMM algorithm, q refers to the arithmetic share of ρ, ξ refers to a slack variable, and u is the scaled dual variable.

10. The distributed support vector machine privacy-preserving system according to claim 9, wherein
a method of using the Boolean sharing to split the penalty parameter in step 4 specifically comprises:
considering $\rho^k \to \rho^{k+1}$ is a progressive increase and an upper bound is $r_i$, obtaining a value of the penalty parameter ρ through a comparison to update the penalty parameter ρ, and dividing $\rho_{i, i+1}^k$ into $\rho_{i, i+1}^k = q_{i, i+1}^k + q_{i+1, i}^k$ to securely compute $\rho_{i, i+1}^k$; wherein an $i^{th}$ participant provides $q_{i, i+1}^k$ and $q_{i, i+1}^{k+1}$, and an $(i+1)^{th}$ participant provides $q_{i+1, i}^k$ and $q_{i+1, i}^{k+1}$;
comparing $q_{i, i+1}^k + q_{i+1, i}^k$ with $q_{i, i+1}^{k+1} + q_{i+1, i}^{k+1}$ without exposing $q_{i, i+1}^k$, $q_{i+1, i}^k$, $q_{i, i+1}^{k+1}$, and $q_{i+1, i}^{k+1}$, converting each term into a Boolean type, and performing a secure addition and the comparison by using a Yao's garbled circuit.

11. The distributed support vector machine privacy-preserving system according to claim 10, wherein
a method of using the arithmetic sharing to split the penalty parameter in step 5 specifically comprises:
in a $(k+1)^{th}$ iteration, securely computing $\rho_{i, i+1}^{k+1}(v_{i+1}^{k+1} - v_i^{k+1})$ as $(q_{i, i+1}^{k+1} + q_{i+1, i}^{k+1})(v_{i+1}^{k+1} - v_i^{k+1})$ by using Shamir's secret sharing, and arithmetically dividing each term, wherein
an $i^{th}$ participant provides $\langle q_{i, i+1}^{k+1} \rangle_1^A$, $\langle q_{i, i+1}^{k+1} \rangle_2^A$, $\langle -v_i^{k+1} \rangle_1^A$, $\langle -v_i^{k+1} \rangle_2^A$, $\langle -q_{i, i+1}^{k+1} v_i^{k+1} \rangle_1^A$, and $\langle q_{i, i+1}^{k+1} v_i^{k+1} \rangle_2^A$,
an $(i+1)^{th}$ participant provides $\langle q_{i+1, i}^{k+1} \rangle_1^A$, $\langle q_{i+1, i}^{k+1} \rangle_2^A$, $\langle v_{i+1}^{k+1} \rangle_1^A$, $\langle v_{i+1}^{k+1} \rangle_2^A$, $\langle q_{i+1, i}^{k+1} v_{i+1}^{k+1} \rangle_1^A$ and $\langle q_{i+1, i}^{k+1} v_{i+1}^{k+1} \rangle_2^A$,
the $i^{th}$ participant sends $\langle q_{i, i+1}^{k+1} \rangle_2^A$, $\langle -v_i^{k+1} \rangle_2^A$ and $\langle -q_i^{k+1} v_i^{k+1} \rangle_2^A$ to the $(i+1)^{th}$ participant,
the $(i+1)^{th}$ participant sends $\langle q_{i+1, i}^{k+1} \rangle_1^A$, $\langle v_{i+1}^{k+1} \rangle_1^A$ and $\langle q_{i+1}^{k+1} v_{i+1}^{k+1} \rangle_1^A$ to the $i^{th}$ participant, and
the $i^{th}$ participant locally computes $\langle -q_{i+1, i}^{k+1} v_i^{k+1} \rangle_1^A$ and $\langle q_{i, i+1}^{k+1} v_{i+1}^{k+1} \rangle_1^A$ to finally determine a value of $(q_{i, i+1}^{k+1} + q_{i+1, i}^{k+1})(v_{i+1}^{k+1} - v_i^{k+1})$ in the shared form as
$\langle (q_{i, i+1}^{k+1} + q_{i+1, i}^{k+1})(v_{i+1}^{k+1} - v_i^{k+1}) \rangle_1^A = \langle q_{i, i+1}^{k+1} v_{i+1}^{k+1} \rangle_1^A + \langle q_{i+1, i}^{k+1} v_{i+1}^{k+1} \rangle_1^A + \langle -q_{i+1, i}^{k+1} v_i^{k+1} \rangle_1^A + \langle -q_{i, i+1}^{k+1} v_i^{k+1} \rangle_1^A$; and
the $(i+1)^{th}$ participant computes $\langle (q_{i, i+1}^{k+1} + q_{i+1, i}^{k+1})(v_{i+1}^{k+1} - v_i^{k+1}) \rangle_2^A = \langle q_{i, i+1}^{k+1} v_{i+1}^{k+1} \rangle_2^A + \langle q_{i+1, i}^{k+1} v_{i+1}^{k+1} \rangle_2^A + \langle -q_{i+1, i}^{k+1} v_i^{k+1} \rangle_2^A + \langle -q_{i, i+1}^{k+1} v_i^{k+1} \rangle_2^A$.

12. The distributed support vector machine privacy-preserving system according to claim 11, wherein
a method of reconstructing the secret in step 6 specifically comprises:
allowing the plurality of participating machines to reconstruct the secret $(q_{i, i+1}^k + q_{i+1, i}^k)(v_{i+1}^k - v_i^k)$ as $(q_{i, i+1}^k + q_{i+1, i}^k)(v_{i+1}^k - v_i^k) = \langle (q_{i, i+1}^k + q_{i+1, i}^k)(v_{i+1}^k - v_i^k) \rangle_1^A + \langle (q_{i, i+1}^k + q_{i+1, i}^k)(v_{i+1}^k - v_i^k) \rangle_2^A$, and compute $\lambda_{i, i+1}^{k+1} = \lambda_{i, i+1}^k + \rho_{i, i+1}^{k+1}(v_i^{k+1} - v_{i+1}^{k+1})$ to update the Lagrange parameter λ.

13. The distributed support vector machine according to claim 8, wherein
iterative processes of solving the sub-problems locally in step 3 are respectively:
for the horizontal data distribution:

$$\{v_i^{k+1}, \xi_i^{k+1}\} = \operatorname{argmin}_{v_i, \xi_i} L(v_i \xi_i \rho^k \lambda^k) + \frac{r_i}{2}\|v_i - v_i^k\|^2,$$

$$\rho^k \to \rho^{k+1},$$

$$\lambda_{i,i+1}^{k+1} = \lambda_{i,i+1}^k + \rho_{i,i+1}^{k+1}(v_i^{k+1} - v_{i+1}^{k+1});$$

and
for the vertical data distribution:

$$v_i^{k+1} = \operatorname{argmin}_{v_i} f_i(vi) + \frac{\rho}{2}\|B_i v_i - B_i v_i^k - z^k + \overline{Bv}^k + u^k\|^2,$$

$$z^{k+1} = \operatorname{argmin}_z g(Nz) + \frac{N\rho}{2}\|z - \overline{Bv}^{k+1} - u^k\|^2,$$

$$u^{k+1} = u^k + \overline{Bv}^{k+1} - z^{k+1}.$$

wherein k refers to $k^{th}$ iteration, z is a variable to formulate an ADMM objective function of a sharing form, $f$ is a general denotation of the function to form the objective function that would be optimized by the ADMM algorithm, q refers to the arithmetic share of ρ, ξ refers to a slack variable, and u is the scaled dual variable.

14. The distributed support vector machine according to claim 13, wherein
a method of using the Boolean sharing to split the penalty parameter in step 4 specifically comprises:
considering $\rho^k \to \rho^{k+1}$ is a progressive increase and an upper bound is $r_i$, obtaining a value of the penalty parameter ρ through a comparison to update the penalty parameter ρ, and dividing $\rho_{i, i+1}^k$ into $\rho_{i, i+1}^k = q_{i, i+1}^k + q_{i+1, i}^k$ to securely compute $\rho_{i, i+1}^k$; wherein an $i^{th}$ participant provides $q_{i,i+1}^{k}$ and $q_{i,i+1}^{k+1}$, and an $(i+1)^{th}$ participant provides $q_{i+1,i}^{k}$ and $q_{i+1,i}^{k+1}$;
comparing $q_{i,i+1}^{k}+q_{i+1,i}^{k}$ with $q_{i,i+1}^{k+1}+q_{i+1,i}^{k+1}$ without exposing $q_{i,i+1}^{k}$, $q_{i+1,i}^{k}$, $q_{i,i+1}^{k+1}$, and $q_{i+1,i}^{k+1}$, converting each term into a Boolean type, and performing a secure addition and the comparison by using a Yao's garbled circuit.

* * * * *